Patented May 8, 1928.

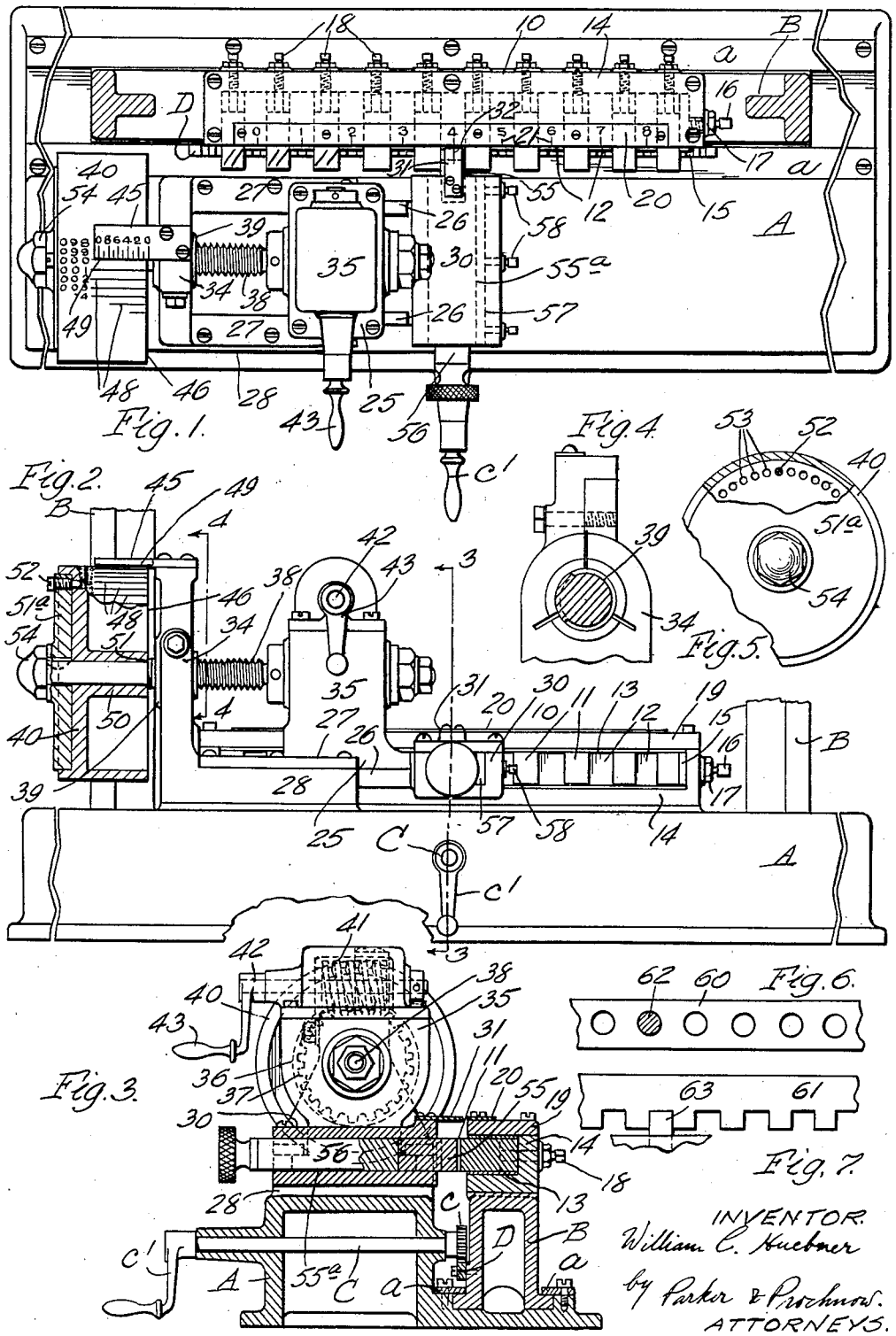

1,668,592

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

PRECISION ADJUSTING AND REGISTERING MECHANISM FOR PHOTOGRAPHIC-PRINTING AND OTHER MACHINES.

Application filed July 2, 1926. Serial No. 120,179.

This invention relates to improvements in precision adjusting and registering mechanisms, and particularly to such mechanisms for use in connection with photographic printing machines and other machines having a movable carriage or member requiring accurate adjustments.

In precision machines having, for example, a screw feed for the adjustment of the carriage, the movement is effected in accordance with the rotation of the screw, which has a definite number of threads per inch or other unit of measure. If only a very slight inaccuracy occurs in the cutting of such threads, the consequent error in the adjustment of the part moved thereby increases more and more as the travel of the part is continued. In photographic printing and composing apparatus such as disclosed, for example in Letters Patent No. 1,431,664, October 10, 1922 issued to me, there is a sliding carriage or member on which is supported a printing or print-receiving plate or surface, and the carriage is moved in a plane parallel with said surface to position a part or parts thereof in required registered relation to a plate or surface arranged opposite to and adapted for contact with said first surface, for making impressions in predetermined registered positions on one of said surfaces. The carriage is moved by an adjusting and registering mechanism whereby repeat prints can be made from one of said elements in predetermined registered locations and positions on the other element, or as in the case of color printing, a number of impressions can be made from one or more printing elements on different color printing surfaces in register with one another. It is necessary in such machines that the adjustments of the sliding carriage be made with extreme accuracy and precision to avoid misregister, and it is desirable to be able to make the various adjustments with the maximum speed.

The usual adjusting or registering means, however, are not absolutely accurate, due to manufacturing inaccuracies and play or lost motion in the screw, rack and pinion or other feed devices employed. The racks are usually cut on machines having a screw feed or by the use of a jig originally made on such a machine.

One object of this invention is to provide an improved precision registering and adjusting mechanism adapted to be operated expeditiously but with great precision to effect the adjustment and positioning of parts of machines which require very accurate adjustments; other objects are to provide a mechanism of this kind with a coarse or quick adjusting rack, scale or element and feed means which enables a quick, preliminary but exact adjustment of the movable carriage or part in inches or other coarse units of measure, and a fine adjusting mechanism adapted, after said quick or coarse adjustment has been made, to be coupled to said movable part for effecting a final adjustment of said part accurately in small fractions of said unit of measure; also to provide a device of the character described in which said coarse adjusting scale permits the part of the machine to which it is attached to be moved quickly by any suitable feed means independently of the precision device, and which enables such movement to be very easily and accurately measured in desired units of measure, and in which said fine adjusting mechanism is then adapted to be coupled to said movable part through said coarse adjusting scale, the movable part being then further adjusted directly by said fine adjustment mechanism to effect an accurate, final adjustment in small fractions of said units of measure; also to construct the coarse adjusting scale or registering element in a novel manner to insure extreme accuracy of register or adjustment of the movable part of the machine; and also to improve and simplify precision registering or adjusting mechanisms in the other respects hereinafter described and claimed.

In the accompanying drawings:

Fig. 1 is a top plan view of a precision registering and adjusting mechanism embodying the invention, showing the same applied to a photographic printing machine, the base and a portion of the adjustable carriage thereof being illustrated.

Fig. 2 is a front elevation thereof, partly in section.

Fig. 3 is a transverse, vertical section thereof, on line 3—3, Fig. 2.

Fig. 4 is a similar view of a portion thereof, on line 4—4, Fig. 2, on an enlarged scale.

Fig. 5 is a fragmentary end view, partly in section, of the rotary dial or indicator thereof.

Figs. 6 and 7 are fragmentary, detail views of two slightly modified forms of coarse adjusting scales adapted for use with certain forms of the mechanisms.

Briefly described, the precision registering and adjusting mechanism of the present invention comprises a coarse adjustment scale indicating travel of the adjustable part in multiples of a coarse unit of measure, a fine adjusting mechanism with means indicating the travel of the part in small fractions of said unit of measure, and a bolt or coupling member for coupling the adjustable part and the fine adjusting mechanism together. The coarse adjustment scale and the fine adjusting mechanism may be respectively mounted on the movable and relatively stationary parts of the machine, or vice versa, the coupling member in either case being adapted to couple the adjusting mechanism to the adjustable part after the coarse adjustment of the latter has been made, after which the fine adjusting mechanism is employed to effect the final movement and precise adjustment of said part.

The invention is applicable to many types of machines in which a movable part is required to be adjusted with precision, and its movements registered with great accuracy.

In the present disclosure, the precision registering and adjusting mechanism is applied to photographic printing apparatus, including a stationary base A, and a horizontally sliding carriage B movable in guides $a$ on said base, and which is adjustable in said guides by suitable means, such as a shaft C journalled in the base A and provided with a pinion $c$ meshing with a toothed rack D fixed on said carriage. The shaft C has a crank $c'$ for turning it.

The coarse adjusting scale, designated generally at 10, is preferably secured stationarily on the carriage B, and extends horizontally, parallel to the plane of movement of said carriage. Preferably it comprises a plurality of separate blocks or portions 11 and 12 arranged so that alternate blocks project out beyond the adjacent blocks at one edge of the scale, in the form of a rack. The horizontal face of each block represents a unit of measurment in the present instance, one-half inch. This rack portion can be formed in any suitable way, but in order to effect extremely accurate measurements, a plurality of "Johansson blocks" is used, a commercial article now on the market, and which are so accurate that they can be employed as standard units of measurement. These blocks are in the form of rectangular prisms, the four parallel faces of which are all exactly alike, so that by arranging a series of the blocks in contact face to face, a scale of extreme accuracy is provided.

The blocks 11 and 12 can be secured in a row, face to face, in any suitable manner, being in the construction illustrated, disposed in a rectangular recess 13 in a box or holder 14 fixed to the carriage B. The block at one end of the series abuts against a stop, such as an end wall of the recess 13, while the block at the opposite end is engaged by a clamping plate or part 15 pressed thereagainst by a set screw 16 passing through a threaded hole in the opposite end wall of the holder and having a lock nut 17 for securing it in adjusted position. The alternate blocks 12 are preferably arranged with their rear ends against the back of the recess 13, while the corresponding parts of the other blocks 11 are spaced therefrom and held in position by adjusting screws 18, whereby the front faces of said blocks 11 can be alined and held in staggered relation to the front faces of the blocks 12, thus forming a rack or rack-like member, the staggered faces of which can be used as a scale. Preferably, the top 19 of the holder is made detachable to facilitate assembling the blocks in the holder. Any other suitable means may be used for securing the blocks of the scale 10 in position. A graduated scale or index 20 is preferably fixed to the top of the box 14 and is provided with graduations 21 indicating units of one inch, and each of which is preferably coincident with the center of the inset blocks 12.

The fine adjusting mechanism of the precision device includes a slide or member 25 to which the carriage B is adapted to be coupled and which is movable parallel with the scale 10 and line of movement of the carriage B, being for this purpose preferably formed with guide ribs 26 engaging in guide-ways 27 of a guide bracket 28 fixed to the stationary base A. On the slide 25 at one end is fixed a pointer 31 which projects over the scale blocks 11 and 12 adjacent the scale 20, and is provided with a scribed line or index 32. The preliminary or coarse adjustment of the carriage B effected by means of the rack and pinion may be registered or read in inches by the movement of the scale 20 past the index 32.

The guide bracket 28 is provided at one end with an upright part or post 34, while the slide 25 has an upright, hollow part or housing 35 in which is enclosed a worm wheel 37 fixed to one end of a screw shaft 38 journalled and prevented from endwise movement in said housing 35. The opposite end of the screw shaft extends through and turns in a nut or threaded part 39 in the post 34 and beyond which it is provided with a cylindrical dial or member 40, fixed so as to turn with said shaft. The screw shaft is rotated by a worm 41 which meshes with said worm wheel 37 and is fixed on a transverse shaft 42 which is journalled in the top of the housing 35 and provided with a crank 43 for turning it.

Projecting from the top of the post 34 over the dial 40 is a fixed scale 45 divided, for example, into ten equal parts each representing a one-tenth fraction of an inch. The screw shaft 38 is formed with a predetermined number of threads per inch, for example, ten. Consequently, each revolution of the shaft 38 causes the slide 25 to travel one tenth of an inch relatively to the fixed post 34, and such travel is measured and indicated by the scale 45, the zero mark of which coincides, for example, with the edge 46 of said dial 40 in the initial position of the parts shown. Therefore, the travel of the slide towards the left will be directly indicated in tenths of an inch by the lengthwise movement of the dial 40 beneath said scale 45.

The dial 40 is adapted to give further readings in small fractions of the scale 45 readings, to enable an extremely fine and accurate measurement of the travel of the slide 25 and of the connected carriage B to be made. For this purpose the cylindrical periphery of the dial is divided by graduations 48 preferably into one-hundred equal parts, the graduations being adapted, in the rotation of the dial, to successively register with an edge 49 of the scale 45. Therefore, while each complete revolution of the screw shaft and dial is indicated by the lengthwise movement of the dial beneath the scale 45, the fractional portions of each revolution are indicated in thousandths of an inch by the rotary movement of the graduations of the dial past the edge 49 of said scale.

The dial 40 is preferably secured on the screw shaft 38 by clamping its hub 50 between a shoulder 51 on said shaft and a clamping disk 51ª which is keyed on the outer end of said shaft and is provided with a screw or stud 52 adapted to enter any one of a circular series of holes 53 in the dial so that by turning the dial on said shaft and engaging the stud in one of the holes the dial can be correctly located in its initial position and then clamped securely and prevented from relative movement on the shaft by a nut 54 screwed on the end of the shaft and engaging the clamping disk 51ª. The dial 40, however, may be constructed and attached to the screw shaft 38 in any other suitable manner.

Means are provided for detachably coupling or interlocking the slide 25 of the fine adjusting mechanism to the coarse adjustment scale, whereby, after the adjustment of the carriage B for the required number of inches has been effected by means of the rack and pinion, the extent of which movement in inches is indicated by the scale 10, the further adjustment and measurement of movement of the carriage B to any required small fraction of an inch can be effected by the fine adjusting mechanism by the rotation of the worm drive of the slide 25.

The means shown for this purpose, see Figs. 1 and 3, comprises a bolt or coupling member 55 slidable endwise in a transverse guide pocket 55ª in the slide 25. The bolt 55 is preferably disposed directly beneath the pointer 31 and adapted, after the coarse adjustment of the carriage B has been effected, to be projected into the space between the two projecting blocks 11 at either side of that graduation of the scale 10 which is coincident with the index mark 32 of the pointer. The bolt 55 preferably consists of another "Johansson block" so that it will exactly fit between the blocks 11 without either looseness or binding. This bolt or block is attached to a stem 56 and is frictionally held in either its projected or retracted position by a plate 57 pressed against said stem by set screws 58. A knob is shown at the outer end of the stem 56 for actuating the bolt 55.

By the use of the precision registering and adjusting device or mechanism described, very accurate and quick adjustments of the movable part of a machine can be secured, as by first moving the part for the major portion of the desired distance, that is for the required number of inches or other units of measurement, before bringing into use the fine adjusting mechanism, this movement being effected with exactness. Then, by coupling the fine adjusting mechanism to the carriage or movable part by the bolt 55 and scale 10, the desired additional fractional movement may be carefully made by the actuation of the crank 43.

Thus, even should a slight error be present in the thread of the screw shaft 38, this error will only occur once for any adjustment, regardless of the distance that the movable part travels. The use of the "Johansson blocks" for the purpose described practically eliminates error in the coarse or unitary adjustment and provides a novel means whereby the coarse adjustment of the movable part may be effected quickly with extreme accuracy.

The use of such blocks, however, at the present time is expensive, and for some classes of work may be prohibitive. Therefore, to lessen expense in quantity production, where it is desired to equip a large number of machines or apparatus with precision devices substantially as described, the scale 10 may be replaced by parts, such as the apertured bar 60, Fig. 6, or the rack 61, Fig. 7, and a complementary coupling bolt 62 or 63 respectively. These members 60 or 61 can be produced with great accuracy on any machine adapted for such purpose by equipping such machine with the precision registering and adjusting device of this invention for the purpose of controlling the feed of the tool carriage or part used for producing the spaced parts of said member 60 or 61, or a set of the blocks, arranged substantially as shown, may be employed as a jig for such purpose.

In the case of the photographic printing apparatus described, the carriage B can be adjusted to any prescribed different positions for making repeat prints and other work, or it can be repeatedly adjusted to like positions for registering successive images in corresponding location, as for multicolor printing work.

I claim as my invention:

1. A precision adjusting mechanism for an adjustable part, comprising a rack and a cooperating coupling member one of which is mounted to move relatively to the other with said adjustable part, said rack being composed of a plurality of accurately formed separate blocks of like dimension arranged face to face and representing like units of measure, said coupling member being adapted by engagement with different blocks of said rack to accurately determine adjustments of said adjustable part in said units of measure, and a fine adjusting mechanism adapted when said coupling member is engaged with said rack to move said adjustable part fractional parts of said unit of measure.

2. A precision adjusting mechanism for an adjustable part, comprising a rack and a cooperating coupling member one of which is mounted to move relatively to the other with said adjustable part, said rack having engaging portions accurately and uniformly spaced apart distances equal to the same unit of measure, said coupling member being adapted by engagement with different engaging portions of said rack to accurately determine adjustments of said adjustable part in said units of measure, and a fine adjusting mechanism adapted when said coupling member is engaged with said rack to move said adjustable part fractional parts of said unit of measure.

3. A precision registering and adjusting mechanism for use on a machine having a part to be adjusted, comprising a coarse registering scale in the form of a rack composed of a plurality of accurately formed separate blocks of like dimension arranged face to face and each representing the same unit of measure, said scale being arranged to indicate movements of said machine part in said unit of measure, and a fine adjusting mechanism arranged to be coupled to said scale and to move and adjust said machine part in fractions of said unit of measure.

4. A precision registering and adjusting mechanism for use on a machine having a part to be adjusted, comprising a coarse registering scale in the form of a rack, composed of a plurality of accurately formed separate blocks of like dimension arranged face to face and each representing the same unit of measure, said scale being arranged to indicate movements of said machine part in said unit of measure, and a fine adjusting mechanism having a coupling member arranged to engage said scale blocks for coupling said fine adjusting mechanism to said scale and which, when so coupled, is adapted to move and adjust said machine part in fractions of said unit of measure.

5. A precision adjusting mechanism for an adjustable part, comprising a rack and a cooperating coupling member one of which is mounted to move relatively to the other with said adjustable part, said rack being composed of a plurality of accurately formed separate blocks of like dimension arranged face to face and representing like units of measure, said coupling member being adapted by engagement with different blocks of said rack to accurately determine adjustments of said adjustable part in said units of measure, and a fine adjusting mechanism adapted, when said coupling member is coupled to said rack, to shift said coupling member, said rack and said adjustable part for adjusting the latter fractional parts of said unit of measure.

6. A precision registering and adjusting mechanism for an adjustable part of a machine having actuating means for moving said part, comprising a coarse adjusting scale in the form of a rack composed of a plurality of accurately formed separate blocks arranged face to face and each representing the same unit of measure, said scale being adapted to register in said units of measure, the movement of said part when shifted by said actuating means, and a fine adjusting mechanism adapted to be coupled to said rack and which is adapted to shift said movable part independently of said actuating means and to register movements of said adjustable part in fractions of said unit of measure.

7. A precision registering and adjusting mechanism for an adjustable part of a machine having actuating means for moving said part, and a part relatively to which said adjustable part is movable, said mechanism comprising a coarse adjusting scale mounted on one of said machine parts and adapted to register the movement of said movable part in coarse units of measure when shifted by said actuating means, and a fine adjusting mechanism mounted on said other machine part and adapted to be coupled to said scale and which is adapted to effect a movement of said movable part and to register such movement in fractions of said units of measure.

8. A precision registering and adjusting device for adjusting a part of a machine with reference to a relatively stationary part and having actuating means for moving said part, said device comprising a coarse adjusting scale in the form of a rack mounted on said movable part and composed of a plurality of staggered contacting blocks each corresponding to a unit of measure, said scale being adapted to register the movements of said part by said actuating means, and a fine adjusting mechanism mounted on said stationary part and having means adapted to interlock said mechanism with said scale substantially at the point thereof which indicates the distance that said movable part has been moved, and said mechanism having means for effecting a further movement of said movable part through said interlocking part independently of said actuating means, and means for measuring such further movement in fractions of said unit of measure.

9. A precision registering and adjusting device for use on a machine having a part to be adjusted with reference to a relatively stationary part and having means for actuating said adjustable part, said device comprising a coarse adjusting scale adapted to register in units of measure the movement of said part when shifted by said actuating means, and a fine adjusting mechanism comprising a guide, a slide movable in said guide member and having a part adapted to be coupled to said adjustable part of said machine after said movement has been effected, means for shifting said slide relative to said guide while the same is coupled to said adjustable part for moving the latter independently of its actuating means, and means for registering said last mentioned movement in fractions of said units of measure.

10. A precision registering and adjusting device for use on a machine having a part to be adjusted with reference to a relatively stationary part, and having means for actuating said adjustable part, said device comprising a coarse adjusting scale mounted on said adjustable part and adapted to register in units of measure the movement of said part when shifted by said actuating means, and a fine adjusting mechanism comprising a fixed member and a member slidable relatively thereto, a part on said slidable member adapted to be engaged with said coarse adjusting scale to couple said slidable member with said adjustable part after said movement has been effected, a screw connecting said fixed and slidable members, means for turning said screw whereby said slide and adjustable part of said machine can be moved independently of the movement effected by said actuating means, and means for indicating said last mentioned movement in fractions of said units of measure.

11. A precision registering and adjusting device for use on a machine having a part to be adjusted with reference to a relatively stationary part, and having means for actuating said adjustable part, said device comprising a coarse adjusting scale mounted on said adjustable part and adapted to register in units of measure the movement of said part when shifted by said actuating means, and a fine adjusting mechanism comprising a fixed member and a member slidable relatively thereto, a part on said slidable member adapted to be engaged with said coarse adjusting scale to couple said slidable member with said adjustable part after said movement has been effected, a screw connecting said fixed and slidable members, means for turning said screw whereby said slide and adjustable part of said machine can be moved independently of the movement effected by said actuating means, a scale on said fixed member, and a part movable with said adjustable part past said scale to indicate the extent of travel of said adjustable part in fractions of said units of measure.

12. A precision registering and adjusting device for use on a machine having a part to be adjusted with reference to a relatively stationary part, and having means for actuating said adjustable part, said device comprising a coarse adjusting scale mounted on said adjustable part and adapted to register in units of measure the movement of said part when shifted by said actuating means, and a fine adjusting mechanism comprising a fixed member and a member slidable relatively thereto, a part on said slidable member adapted to be engaged with said coarse adjusting scale to couple said slidable member with said adjustable part after said movement has been effected, a screw connecting said fixed and slidable members, means for turning said screw whereby said slide and adjustable part of said machine can be moved independently of the movement effected by said actuating means, a scale on said fixed member, and a dial which is fixed on said screw and movable therewith axially relative to said scale to indicate fractions of said units of measurement, and rotates with said screw past said scale to indicate smaller divisions of said fractional measurements.

13. A precision registering and adjusting device for use on a machine having a part to be adjusted with reference to a relatively stationary part and having means for actuating said part, said device comprising a coarse adjusting scale mounted on said adjustable part and having a plurality of alternating staggered and accurately dimensioned parts each corresponding to the same unit of measure, and a fine adjusting mechanism mounted on said stationary part and having an index past which said scale moves to indicate the extent of travel of said adjustable part of said machine, an interlocking member arranged coincident with said index and adapted to be projected between pairs of said parts of the scale in a position coincident with the portion of said scale registering with said index to couple said fine adjusting mechanism to said movable part, said fine adjusting mechanism being adapted to move said adjustable part independently of said actuating means when so coupled, and means for measuring said last mentioned movement in fractions of said units of measure.

14. In a precision registering and adjusting device, a scale comprising a series of accurately formed blocks of like dimensions arranged face to face in staggered relation, a holder in which said series of blocks is arranged, a stop on said holder against which a block at one end of said series abuts, clamping means at the opposite end of said series adapted to press said blocks toward said stop to releasably hold the same in said holder, and an adjusting screw for each alternate block extending through a part of said holder and engaging said block whereby said alternate blocks may be adjustably positioned in staggered relation to said other blocks.

15. A precision registering and adjusting device for an adjustable machine part, said device comprising a coarse adjusting scale composed of a series of accurately formed blocks of like dimensions arranged in abutting and staggered relation and adapted to register in multiples of the same unit of measure the movement of said adjustable part, and a fine adjusting mechanism having a coupling member comprising a like accurately formed block adapted to be engaged between alternate blocks of said scale, and means for shifting said adjustable part when said scale and coupling member are coupled together, and means for indicating the extent of such movement in fractions of said unit of measure.

WILLIAM C. HUEBNER.